Oct. 6, 1964   N. NEBOUT   3,152,031
PLY-TURNING APPARATUS FOR THE MANUFACTURE OF PNEUMATIC TYRES
Filed July 3, 1962   6 Sheets-Sheet 1

Inventor:
Noel Nebout
by Benj. T. Rauber
attorney

United States Patent Office 3,152,031
Patented Oct. 6, 1964

3,152,031
PLY-TURNING APPARATUS FOR THE MANU-
FACTURE OF PNEUMATIC TYRES
Noel Nebout, Montlucon, France, assignor to Dunlop
Rubber Company Limited, London, England, a British
company
Filed July 3, 1962, Ser. No. 207,321
Claims priority, application France, July 4, 1961,
866,946
9 Claims. (Cl. 156—401)

This invention relates to ply-turning apparatus in the manufacture of pneumatic tyres and is more particularly concerned with apparatus for turning radially inwardly the ends of a pneumatic tyre component applied in substantially cylindrical condition to a tyre building former or to a carcass or part carcass mounted thereon.

Apparatus have been proposed for turning radially inwardly the ends of pneumatic tyre components, e.g., plies, applied to a former, but it is known that in use, such apparatus tend to stretch and deform the tyre components during a turning operation.

The object of the present invention is to provide apparatus to effect a ply turning operation which either eliminates or reduces this tendency.

According to the present invention apparatus for turning radially inwardly the ends of a pneumatic tyre component carried in substantially cylindrical condition on a tyre building former comprises a rigid annular support, an annular inflatable member contained within the rigid annular support, the inflatable member comprising a reinforcement which renders the inflatable member substantially inextensible in a direction substantially normal to the circumferential direction of the inflatable member, mounting means for holding the inflatable member, the inflatable member being secured to the mounting means by two axially-spaced-apart portions which are axially movable towards and away from one another upon the mounting means, and means for locating the apparatus co-axially with the tyre building former and in a predetermined position with respect to the median plane of the former.

The mounting means for the inflatable member may comprise a rigid annular member which is axially movable relative to the annular support. The mounting means may, however, comprise two rigid relatively movable annular members, to each of which the inflatable member is secured.

Preferably, means are provided for urging the spaced-apart portions of the inflatable member to move in a direction away from one another upon deflation of the member.

The invention also includes a pneumatic tyre in the manufacture of which apparatus as defined above has been used.

Embodiments of the invention will now be described, by way of example, with reference to the accompanying drawings in which.

Figure 1:
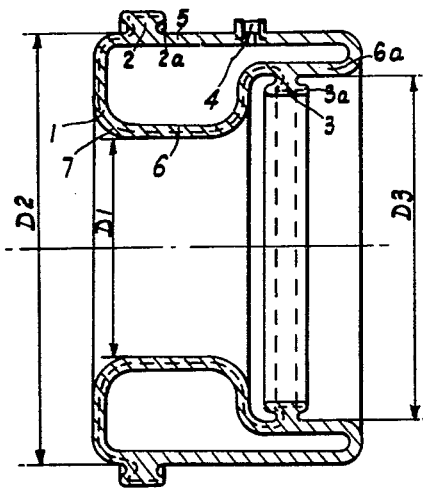
FIGURE 1 is an axial cross-sectional view of an inflatable member forming part of the apparatus of one embodiment of the invention.
Figure 2:
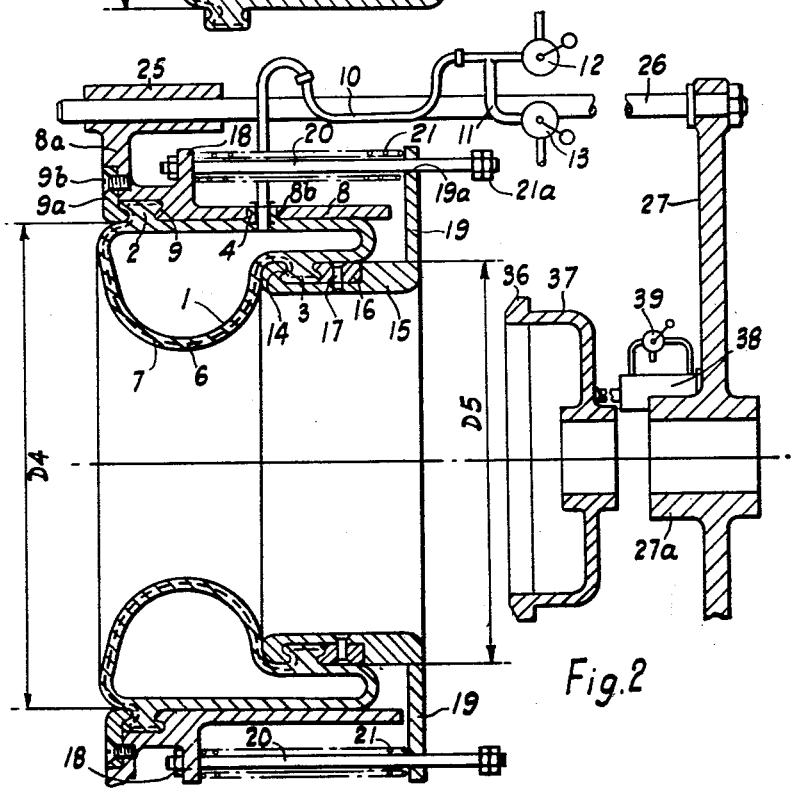
FIGURE 2 is an axial cross-sectional view of apparatus forming a first embodiment of the invention incorporating the inflatable member shown in FIGURE 1.

In a first embodiment of the invention, as shown in FIGURES 1 and 2, apparatus for turning the ends of plies of a pneumatic tyre radially inwardly over the ends of a tyre building former comprises a rigid annular support member 8 within which is contained an annular inflatable bag 1. Means for mounting the bag is comprised by the support member 8 which is provided with an annular groove 9 provided on the inner peripheral surface of the support, within which a bead 2 is contained, the bead being formed on an outer cylindrical portion 5 of the bag. A mounting member in the form of a rigid annular mounting member 15 contained within the support is also provided with means for mounting the bag. This means comprises an annular groove 14 formed on the outer peripheral surface of the member the groove containing a bead 3 formed on a portion 6a of the bag. The beads 2 and 3 are retained within the grooves 9 and 14, respectively, by a ring 9a secured to the support 8 by a screw 9b and by a ring 16 secured to the mounting member 15 by a screw 17.

The bag 1 is formed in the annular shape shown in FIGURE 1, the radially inner portion of the bag comprising an inflatable portion 6 having an inner diameter D1, and the portion 6a having a diameter D3 which is greater than the diameter D1. The bag incorporates a reinforcement 7 which extends around the portion 6 of the bag, between the edges 2a and 3a of the beads 2 and 3. The reinforcement comprises a plurality of metal cords which extend in parallel relationship in a direction substantially normal to the circumferential direction of the bag.

When the bag is attached to the support 8 and the mounting member 15, the bag is stretched and placed in tension, the diameters D4 and D5 of the bag (FIGURE 2) being, respectively, greater than its diameters D2 and D3 before assembly.

The bag 1 is inflatable through a pipe 4 and tube 10, the pipe 4 being housed in a passageway 8b of the support number 8, a valve 12 incorporated in the tube 10 being provided for connecting and disconnecting the bag to a source of compressed air. Another pipe 11 is connected to the pipe 10 to connect the bag, through a valve 13, to a means for deflating the bag and for reducing the pressure within the bag below ambient atmospheric pressure.

The mounting member 15 is provided with a radially-extending flange 19, the mounting member 15 being co-axially mounted with respect to the support member 8 by a plurality of spaced-apart axially extending shafts 20. The shafts are secured at one end to a flange 18 of the support member 8 and are slidably mounted through bores 19a provided in the flange 19, so that the mounting member 15 is axially movable relative to the support member 8. A pair of locknuts 21a are received upon the unsecured end of each of the shafts for retaining the mounting member 15 upon the shafts. A compression spring 21 is mounted on each shaft disposed between the flanges 18 and 19 and, together, they provide means for urging the mounting member 15 axially away from the support member 8 and the bead 3 away from the bead 2 upon deflation of the bag, as will be described.

The support member 8 comprises a plurality of spaced-apart radially-extending arms 8a at the ends of which are integrally formed axially extending sleeves 25, slidably mounted within which are shafts 26, secured each by one of its ends to a disc 27. The disc is provided with a sleeve 27a for mounting the apparatus coaxially with respect to a tyre building former.

Figure 4:
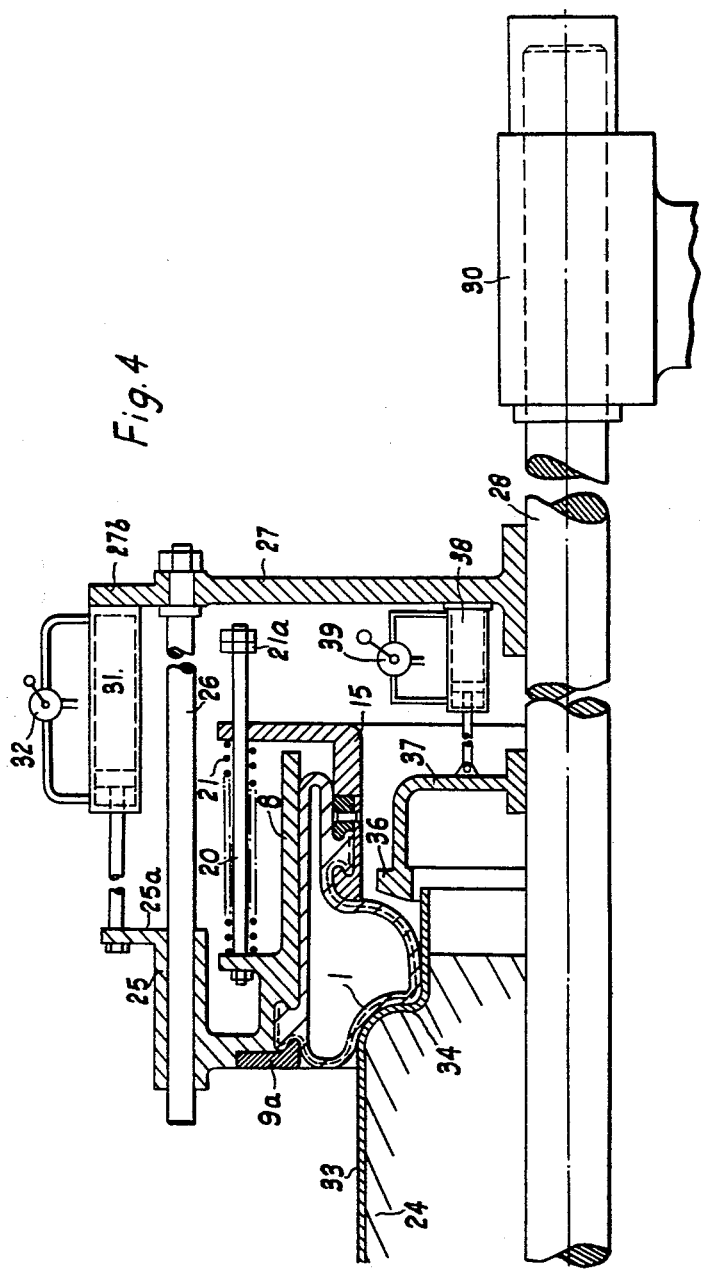

As shown in FIGURE 4, a double-acting pneumatic piston and cylinder 31 controlled by a valve 32 provides means for locating the apparatus in a predetermined position with respect to the median plane of a former. One end of the cylinder is secured to a radial extension 27b of the disc 27 and the remote end of the piston rod is secured to a radial extension 25a of one of the sleeves 25.

Means are also provided for applying an axial force to the bag 1 to urge the bag firmly against the end of a ply after the ply has been turned radially inwardly over the side of a former. This means comprises a ring 36 mounted coaxially within the member 15 upon a cage 37, the cage and the ring being movable axially by a pneumatic piston and cylinder 38 controlled by a valve 39, the cylinder being mounted upon the disc 27 and the piston rod being connected to the cage 37.

In use of the apparatus, the shape of the bag is initially as shown in FIGURE 2. In this condition, the internal diameter D6 of the bag is smaller than the diameter d (FIGURE 3) of the building former around which the apparatus is to be positioned. To increase the diameter D6, to allow the former to be placed within the apparatus, the air pressure within the bag is reduced below ambient atmospheric pressure allowing the mounting member 15 to move axially away from the support member 8 under the pressure of springs 21 to force the bag into the substantially cylindrical condition shown in FIGURE 3.

Figure 3:
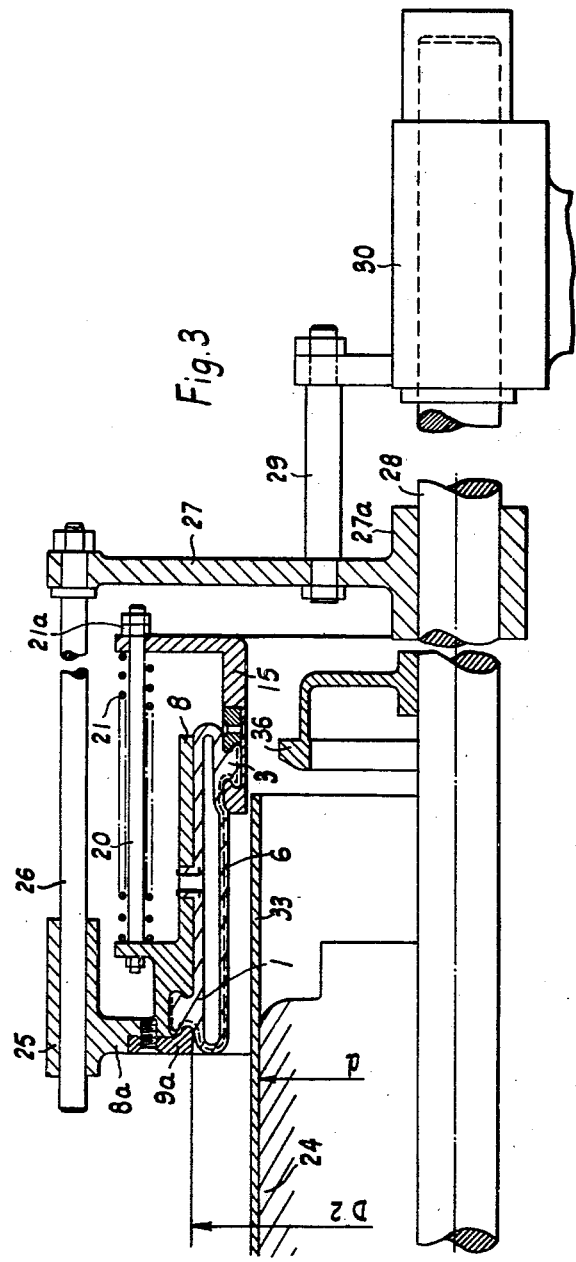
FIGURES 3 and 4 are partial axial cross-sectional views, in different planes, of the apparatus shown in FIGURE 2 assembled on a tyre building former, showing different stages in the use of the apparatus for turning the ends of the plies of a pneumatic tyre over the ends of a tyre building former.

The apparatus is then positioned coaxially with respect to a tyre building former 24, as shown in FIGURE 3, upon which a ply 33 has previously been placed in a cylindrical condition, the sleeve 27a and cage 37 being slidably mounted upon the driving shaft 28 of the former. The disc 27 is secured by a plurality of tie-rods 29 to a part 30 of the machine frame. To locate the support member 8, bag 1 and member 15 in a correct axial position adjacent the end of the former, the pneumatic piston and cylinder 31 is operated to slide the support member 8 along the shafts 26.

The bag 1 is then inflated to turn the end 34 of the ply down over the side of the former. As the inflatable portion 6 of the bag is reinforced by the reinforcement 7 there is substantially no expansion of the bag between the beads during inflation so that inflation causes the bead 3 to move towards the bead 2 thus compressing the springs 21. The bag is therefore, caused to roll progressively along the end of the ply during inflation to turn the ply down over the former. There is, in consequence, little or no relative sliding movement between the bag and the end of the ply resulting in little or no stretching or distortion of the ply by the bag.

When the bag is fully inflated, the ring 36 is moved axially into contact with the bag to urge it more closely into engagement with the end of the ply and so force it more firmly against the end of the former.

To allow for removal of the apparatus from the former, the bag is deflated allowing the bead 3 to be moved away from the bead 2, thus increasing the internal diameter of the bag and drawing it radially clear of the ply.

Figure 5:
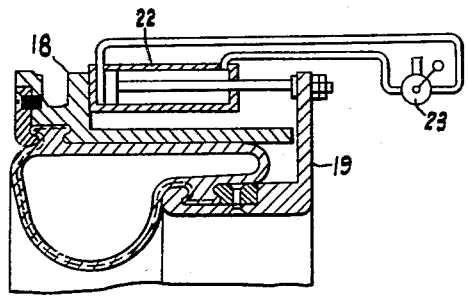
FIGURE 5 is a view similar to FIGURE 2 showing a modification to the apparatus shown in FIGURE 2.

In a modification of the apparatus described above, as shown in FIGURE 5, the springs 21 together with the shafts 20 are replaced by a double-acting pneumatic cylinder and piston 22 controlled by a valve 23, the cylinder being secured to the flange 18 and the end of the piston rod being secured to the flange 19.

In a second embodiment of the invention now to be described, parts which are identical with parts described in the first embodiment bear the same reference numerals as are used in respect of the first embodiment.

Figure 7:
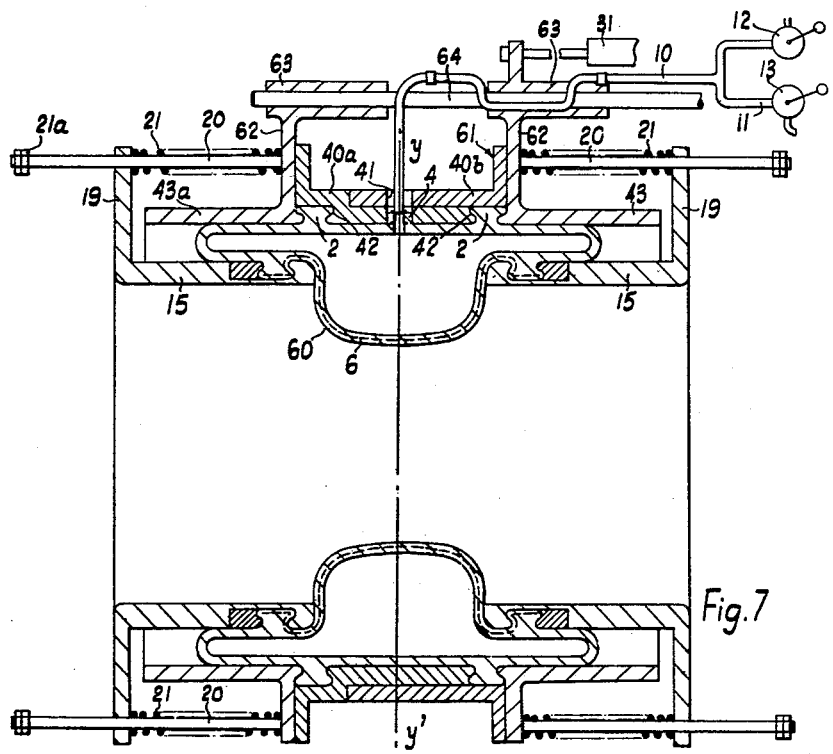
FIGURE 7 is an axial cross-sectional view of apparatus forming a second embodiment of the invention incorporating the inflatable member shown in FIGURE 6.

In the second embodiment as shown in FIGURE 7 an inflatable annular bag 60 is mounted within a rigid annular support 61, two mounting members 15 being axially movable mounted within the support 61.

Figure 6:
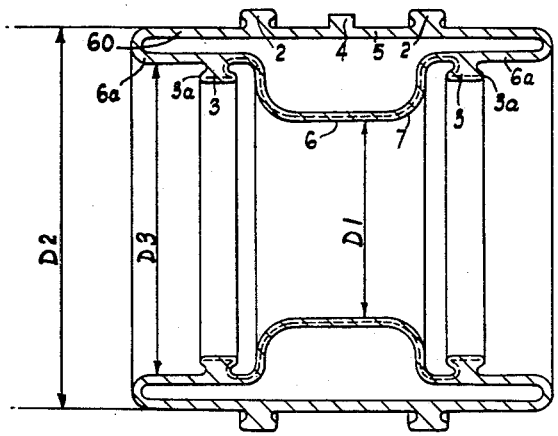
FIGURE 6 is a view similar to FIGURE 1 of an inflatable member forming part of apparatus which forms a second embodiment of the invention.

The bag 60 although being similar to the bag 1 of the first embodiment, comprises two portions 6a (FIGURE 6) which are located one axially on each side of the reinforced portion 6 of the bag. Each portion 6a comprises a bead 3 by which the bag is mounted within the mounting members 15, the reinforcement 7 of the bag extending between the edges 3a of the beads 3. The outer cylindrical portion 5 of the bag comprises two beads 2 which are secured within annular grooves 42 formed between four annuli 40a, 40b, 43 and 43a, secured to each other to form the support 61.

Each mounting member 15 is slidably mounted upon shafts 20 secured to flanges 62 of the support 61, the shafts carrying compression springs 21 as in the first embodiment.

The apparatus is provided with a means for mounting the apparatus coaxially with respect to a tyre building former. This means comprises a plurality of axially extending sleeve 63 which are formed integrally on each of the flanges 62, a plurality of shafts 64, each extending through one of the sleeves on each of the flanges, being secured to a disc (not shown) similar to the disc 27 of the first embodiment. A pneumatic piston and cylinder 31 secured to the disc and to one of the sleeves 63 provides means for positioning the apparatus symmetrically with respect to the median plane of a tyre building former.

Means, similar to the ring 36 and cage 37 of the first embodiment, are also provided at each end of the apparatus for urging the bag against the end of a ply to press it firmly into engagement with the end of a former.

Figure 8:
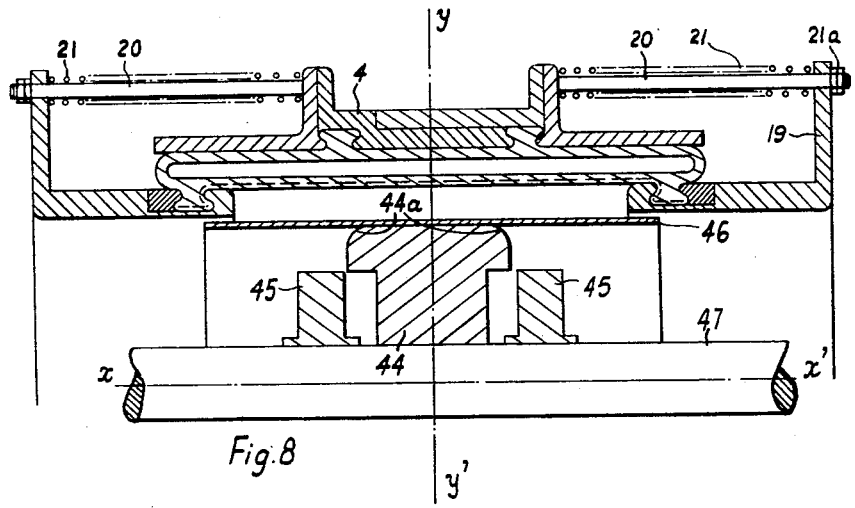
FIGURES 8 and 9 are views similar to FIGURES 3 and 4 of the different stages of the use of the apparatus shown in FIGURE 7.
Figure 9:
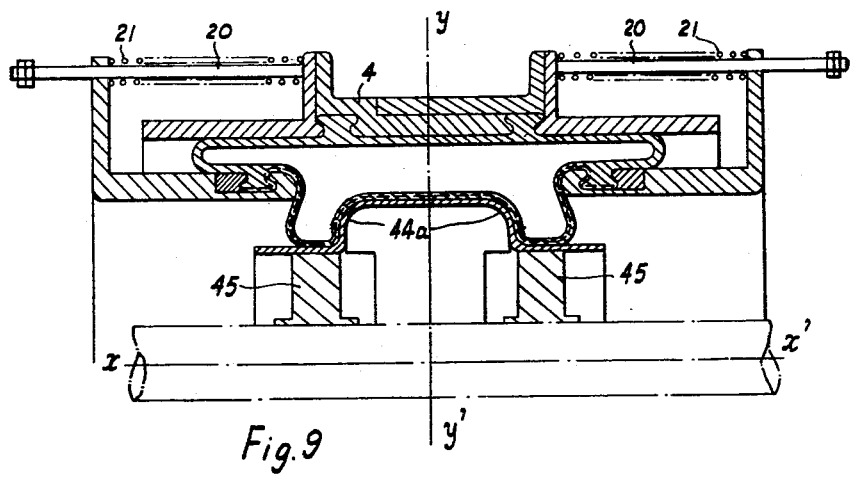

In the use of the apparatus, the air pressure within the bag 60 is decreased below ambient atmospheric pressure as in the first embodiment to allow the mounting members 15 to move axially apart to form the bag 60 into a cylindrical condition as shown in FIGURE 8. The apparatus is then positioned co-axially around a tyre building former 44 and symmetrically with respect to the median plane of the former after a length 46 of ply material has been placed around the former, by sliding the apparatus along the former driving shaft 47. The bag 60 is inflated causing the members 15 to move axially towards one another, the bag engaging progressively with the ends of the ply layer and turning them radially inwardly progressively over the shoulders 44a of the former into engagement with subsidiary formers 45 disposed one on each side of the former. This condition is shown in FIGURE 9. The ends of the ply are then pressed more firmly into engagement with the ends of the former in the manner described in the first embodiment and the apparatus is then removed.

Figure 10:
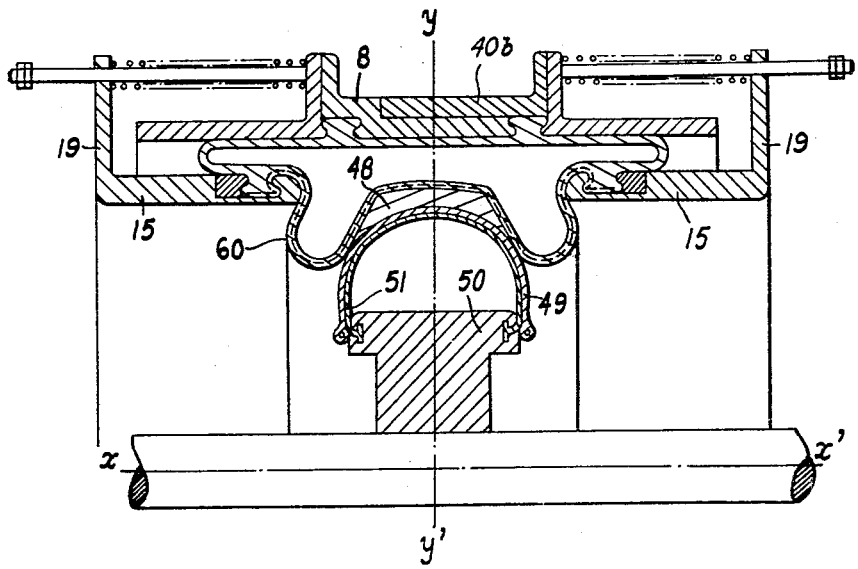
FIGURE 10 shows a partial axial cross-sectional view of the apparatus shown in FIGURE 7 in use for applying a tread layer to a pneumatic tyre.

FIGURE 10 illustrates the use of an apparatus, identical in construction to that described in the second embodiment, for applying a tread layer 48 to a carcass 49 in a toroidal shape. The carcass is built in cylindrical condition upon an inflatable diaphragm forming part of a building former 50. An annular tread layer 48 is positioned axially and symmetrically with respect to the carcass which is inflated up into a toroidal condition and into engagement with the tread layer in the crown region of the carcass. The apparatus for turning the ends of the tread layer down into engagement with the carcass is then located in position and the bag 60 is inflated to effect the turning operation in a similar manner to that described in the second embodiment.

Having now described my invention, what I claim is:

1. Apparatus for turning radially inwardly the ends of a pneumatic tyre component carried in substantially cylindrical condition on a tyre building former comprising an inflatable annular member, mounting means for the inflatable member, said mounting means comprising a rigid annular support member, radially surrounding the inflatable member, and at least one mounting member, the inflatable member having two axially spaced portions secured one to one member of the mounting means and the other to another member of the mounting means, the members of the mounting means to which the inflatable member is secured being relatively axially movable to move said axially spaced portions of the inflatable member into closer relationship during a turning operation, the inflatable member having a radially inner portion extending between the axially spaced portions, said inner portion including a reinforcement which renders the inner portion substantially inextensible in a direction normal to the circumferential direction of the inflatable member, the radially inner portion being deformable radially inwardly toward the axis of the former during inflation of the inflatable member and during movement of the axially spaced portions of the member into closer relationship, to perform a radially inward turning operation, and means for locating the apparatus coaxially with the tyre building former and in a predetermined position with respect to the median plane of the former.

2. Apparatus according to claim 1 wherein the reinforcement comprises a plurality of substantially inextensible filamentary cords which extend in parallel relationship in a direction substantially normal to the circumferential direction of the inflatable member.

3. Apparatus according to claim 1 wherein the mounting member is a rigid annular mounting member which is axially movable relative to the rigid annular support member, the inflatable member being secured by one portion to the annular support member and by another portion to the annular mounting member.

4. Apparatus according to claim 3 wherein the inflatable member comprises two annular bead portions for mounting the member, one bead portion being secured to the rigid annular mounting member and the other to the rigid annular support member.

5. Apparatus according to claim 1 wherein the mounting means for the inflatable member comprises two relatively axially movable mounting members, the two portions of the inflatable member being secured one to each of the mounting members.

6. Apparatus according to claim 5 wherein the inflatable member is provided for applying a tread layer to a carcass and for turning the ends of a tread layer or ply radially inwardly, the inflatable member comprising at least three bead portions for mounting the member, one bead portion at least being secured to the rigid annular support member, the other bead portions being secured one to each of the mounting members.

7. Apparatus according to claim 1 wherein means are provided for urging the spaced-apart portions of the inflatable member to move in a direction away from one another upon the reduction of air pressure within the inflatable member.

8. Apparatus according to claim 1 wherein means are provided for applying an axial force to the inflatable member to assist in turning the ends of the tyre building component radially inwardly.

9. Apparatus according to claim 8 wherein said means for applying the axial force to the inflatable member comprises a ring mounted coaxially within the mounting means for the inflatable member, means being provided for moving the ring coaxially into contact with the inflatable member so as to force the inflatable member against the end of the component.

References Cited in the file of this patent

UNITED STATES PATENTS

| | | |
|---|---|---|
| 1,458,732 | Sloper | June 12, 1923 |
| 1,559,972 | Midgley | Nov. 3, 1925 |
| 2,986,196 | Frazier | May 30, 1961 |
| 3,044,533 | Lowe | July 17, 1962 |
| 3,063,491 | Mitchell | Nov. 13, 1962 |
| 3,078,204 | Appleby | Feb. 19, 1963 |

FOREIGN PATENTS

| | | |
|---|---|---|
| 175,754 | Great Britain | Feb. 20, 1922 |
| 812,155 | Great Britain | Apr. 22, 1959 |